United States Patent
Zhang et al.

(10) Patent No.: US 12,541,254 B2
(45) Date of Patent: Feb. 3, 2026

(54) METHOD FOR CREATING TACTILE EFFECT IN REAL TIME THROUGH GESTURE AND RELATED DEVICE

(71) Applicant: AAC Acoustic Technologies (Shanghai) Co., Ltd., Shanghai (CN)

(72) Inventors: Xiaoyu Zhang, Shanghai (CN); Zhaohua Wu, Shanghai (CN)

(73) Assignee: AAC Acoustic Technologies (Shanghai) Co., Ltd., Shanghai (CN)

(*) Notice: Subject to any disclaimer, the term of this patent is extended or adjusted under 35 U.S.C. 154(b) by 257 days.

(21) Appl. No.: 18/401,261

(22) Filed: Dec. 29, 2023

(65) Prior Publication Data

US 2024/0419249 A1 Dec. 19, 2024

Related U.S. Application Data

(63) Continuation of application No. PCT/CN2023/100807, filed on Jun. 16, 2023.

(51) Int. Cl.
*G06F 3/01* (2006.01)
*G06F 3/0488* (2022.01)

(52) U.S. Cl.
CPC ............ *G06F 3/016* (2013.01); *G06F 3/0488* (2013.01)

(58) Field of Classification Search
CPC .................. G06F 3/016; G06F 3/0488
See application file for complete search history.

(56) References Cited

U.S. PATENT DOCUMENTS

| | | | |
|---|---|---|---|
| 2013/0124697 A1* | 5/2013 | Mehrotra | H04L 65/70 709/219 |
| 2017/0024899 A1* | 1/2017 | Hammoud | G06V 10/758 |
| 2017/0236323 A1* | 8/2017 | Lim | H04N 21/23614 345/419 |
| 2018/0041610 A1* | 2/2018 | Denoual | H04N 21/8586 |
| 2020/0254311 A1* | 8/2020 | Watterson | A63B 22/025 |
| 2022/0408166 A1* | 12/2022 | Maze | H04N 21/8133 |

* cited by examiner

*Primary Examiner* — Seth A Silverman
(74) *Attorney, Agent, or Firm* — Wiersch Law Group (57) ABSTRACT

A method for creating tactile effect in real time through a gesture and a related device includes: acquiring a target graphic file, automatically splitting the target graphic file into tracks, and displaying track parameter of the track; identifying whether the track has the track parameter; detecting an inputted gesture tactile signal in real time, generating a corresponding real-time vibration signal according to a preset rule, synchronously writing the real-time vibration signal as input parameter to track parameter, and simultaneously driving a vibration unit to produce a corresponding vibration feedback effect; and binding all the real-time vibration signals generated within a playback duration of the target graphic file to the target graphic file to form a final vibration signal of the target graphic file. In the method, a user can customize tactile effects for target audio and video files, which is convenient to operate and brings better user experience.

12 Claims, 3 Drawing Sheets

METHOD FOR CREATING TACTILE EFFECT IN REAL TIME THROUGH GESTURE AND RELATED DEVICE

CROSS-REFERENCE TO RELATED APPLICATIONS

This application is a continuation of International Application No. PCT/CN2023/100807, filed on Jun. 16, 2023, which is hereby incorporated by reference in its entirety.

TECHNICAL FIELD

The present disclosure relates to the technical field of tactile effect generation methods, and in particular, to a method for creating a tactile effect in real time through a gesture applied to a touch-screen electronic terminal and a related device.

BACKGROUND

With the development of electronic products, people have higher requirements for sound and vibration feedback effects. Therefore, more and more electronic terminals, such as mobile phones and tablet computers, are provided with speakers as audio output and vibration motors as vibration tactile feedback output.

However, in the related art, vibration effect design to achieve tactile vibration feedback is mainly to achieve relevant effects through code programming for product or scene requirements in advance, and the effects are fixed. For ordinary users, the vibration effect cannot be edited and modified to meet their own requirements. In addition, no relevant vibration effect production tools are available on the market, no easy-to-learn vibration effect design methods are available, and tactile vibration design has always been a skill mastered by very few professionals. Therefore, few users experience fun of tactile design, which greatly limits user experience of design and effect requirements for tactile vibration feedback.

Therefore, it is necessary to provide a new method for creating a tactile effect in real time through a gesture and a related device to solve the above technical problems.

SUMMARY

An objective of the present disclosure is to provide a method for creating a tactile effect in real time through a gesture and a related device, to enable a user to customize tactile effects for target audio and video files, which is easy and convenient to operate and brings better user experience.

In order to achieve the above objective, a first aspect of the present disclosure provides a method for creating a tactile effect in real time through a gesture. The method is applied to a touch-screen electronic terminal and includes the following steps:
  acquiring a target graphic file, automatically splitting the target graphic file into tracks, and displaying a track parameter of each of the tracks;
  identifying whether each of the tracks has the track parameter, if yes, defining the track parameter of the track as an adjustable track parameter;
  detecting an inputted gesture tactile signal in real time, generating, based on the gesture tactile signal detected in real time, a corresponding real-time vibration signal according to a preset rule, simultaneously driving, through the real-time vibration signal, a vibration unit to produce a corresponding vibration feedback effect, and synchronously writing the real-time vibration signal as an input parameter to the track parameter; wherein the real-time vibration signal is synchronized with the track on a timeline; and
  binding all the real-time vibration signals generated within a playback duration of the target graphic file to the target graphic file to form a final vibration signal of the target graphic file to cause the target graphic file to produce a tactile effect.

In an embodiment, the target graphic file includes at least one of an audio file, a video file, an animation file, a moving-picture file, and a dynamic-expression file.

In an embodiment, the gesture tactile signal includes at least one of tap, long press, and swipe.

In an embodiment, the gesture tactile signal is generated by different touch modules displayed on a touch screen.

In an embodiment, the preset rule includes:
  defining the gesture tactile signal as tap when a duration of the gesture tactile signal is smaller than or equal to a preset duration, and generating, according to a tapping duration, a first real-time vibration signal whose generation duration is equal to the preset duration; and
  defining the gesture tactile signal as long press when the duration of the gesture tactile signal is greater than the preset duration, and generating, according to a long-pressing duration, a second real-time vibration signal with a corresponding duration.

In an embodiment, the preset duration is 100 ms.

In an embodiment, the preset rule further includes:
  detecting the gesture tactile signal as swipe when it is detected that the gesture tactile signal is pressed continuously and enters different intensity intervals, generating a third real-time vibration signal with a corresponding duration according to a swiping duration, recording a vibration intensity value corresponding to a previous intensity interval each time the gesture tactile signal enters a different intensity interval, converting the vibration intensity value into a curve point of changes in vibration intensity, and writing the curve point into the third real-time vibration signal as an intensity change turning point of the third real-time vibration signal at a different time point; wherein the intensity intervals are N equal parts into which a touch screen region where the gesture tactile signal is inputted is divided from top to bottom, a difference corresponding to each of the equal parts is X, and an overall intensity interval range of the touch screen region where the gesture tactile signal is inputted is [0, X*N], where N and X are natural numbers.

In an embodiment, the preset rule further includes:
  causing, when the third real-time vibration signal drives the vibration unit to produce a real-time vibration feedback effect and a number of the curve points exceeds an upper limit, the vibration unit to stop vibrating, removing the curve points exceeding the upper limit, and writing the curve points within an upper limit range into the third real-time vibration signal, to generate a final third real-time vibration signal.

In an embodiment, the preset rule further includes:
  detecting, when the third real-time vibration signal drives the vibration unit to produce the real-time vibration feedback effect and the number of the curve points is within the upper limit range and the gesture tactile signal stagnates in a same intensity interval and swipes, a duration during which a current gesture tactile signal stagnates in the same intensity interval, and if a preset stagnation time is exceeded, causing the vibration unit to stop vibrating, and inserting the curve point into the third real-time vibration signal, to generate the final third real-time vibration signal; and complementing, if a number of the curve points of the final third real-time vibration signal is smaller than a lower limit at the end of vibration, the curve points equal to the lower limit at the end of the final third real-time vibration signal according to a basic criterion of the final third real-time vibration signal, to update the final third real-time vibration signal.

In an embodiment, N=5, and X=20; and an intensity interval of the touch screen region where the gesture tactile signal is inputted is [0, 100]; for the curve points of the same third real-time vibration signal, the upper limit is 16, and the lower limit is 4; and the preset duration is 5 s.

A second aspect of the present disclosure further provides a system for creating a tactile effect in real time through a gesture. The system includes:

a track splitting module configured to acquire a target graphic file, automatically split the target graphic file into tracks, and display a track parameter of each of the tracks;

a track parameter identification module configured to identify whether each of the tracks has the track parameter: if yes, define the track parameter of the track as an adjustable track parameter;

a vibration signal generation module configured to detect an inputted gesture tactile signal in real time, generate, based on the gesture tactile signal detected in real time, a corresponding real-time vibration signal according to a preset rule, simultaneously drive, through the real-time vibration signal, a vibration unit to produce a corresponding vibration feedback effect, and synchronously write the real-time vibration signal as an input parameter to the track parameter; wherein the real-time vibration signal is synchronized with the track on a timeline; and a tactile effect generation module configured to bind all the real-time vibration signals generated within a playback duration of the target graphic file to the target graphic file to form a final vibration signal of the target graphic file to cause the target graphic file to produce a tactile effect.

A third aspect of the present disclosure further provides an electronic device. The electronic device includes a processor, a memory, and a program for creating a tactile effect in real time through a gesture that is stored in the memory and executable by the processor, wherein, when the program for creating a tactile effect in real time through a gesture is executed by the processor, steps in the method for creating a tactile effect in real time through a gesture as provided above in the present disclosure are implemented.

A fourth aspect of the present disclosure further provides a computer-readable storage medium. The computer-readable storage medium stores a program for creating a tactile effect in real time through a gesture, and when the program for creating a tactile effect in real time through a gesture is executed by a processor, steps in the method for creating a tactile effect in real time through a gesture as provided above in the present disclosure are implemented.

Compared with the related art, according to the method for creating a tactile effect in real time through a gesture and the related device in the present disclosure, a target graphic file is split into tracks, a track parameter of each of the tracks is displayed, an inputted gesture tactile signal is detected in real time, a corresponding real-time vibration signal is generated based on the gesture tactile signal according to a preset rule, and the real-time vibration signal is synchronously written as an input parameter to the track parameter, so as to convert the gesture tactile signal into a real-time vibration signal for output. A gesture has strong interactive correlation with intensity and a frequency thereof, and a converted vibration effect parameter changes in real time with the gesture, thereby achieving a purpose of creating a tactile effect through the gesture, so that the user can customize tactile effects for target audio and video files, which is easy and convenient to operate and brings better user experience.

BRIEF DESCRIPTION OF DRAWINGS

In order to illustrate the technical solutions in the embodiments of the present disclosure more clearly, the accompanying drawings to be used in the description of the embodiments will be briefly introduced below. The accompanying drawings in the following description are only some embodiments of the present disclosure. For those skilled in the art, other accompanying drawings can be obtained based on these drawings. In the drawings.

DESCRIPTION OF EMBODIMENTS

The technical solutions in the embodiments of the present disclosure will be clearly and completely described below with reference to the accompanying drawings in the embodiments of the present disclosure. The described embodiments are only some of the embodiments of the present disclosure, but not all of the embodiments. Based on the embodiments of the present disclosure, all other embodiments obtained by those skilled in the art fall within the protection scope of the present disclosure.

Embodiment 1

Figure 1:
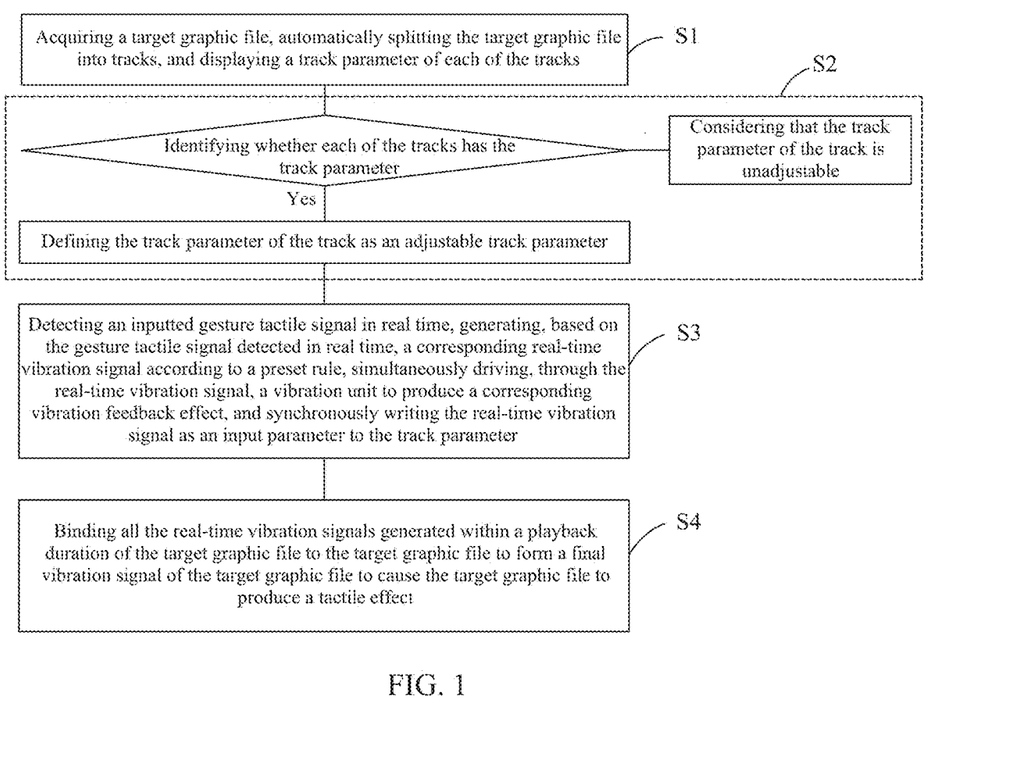
FIG. 1 is a flowchart block diagram of a method for creating a tactile effect in real time through a gesture according to an embodiment of the present disclosure.

Referring to FIG. 1, a method for creating a tactile effect in real time through a gesture is applied to a touch-screen electronic terminal, such as a mobile phone or a tablet computer. The method includes the following steps.

In step S1, a target graphic file is acquired, the target graphic file is automatically split into tracks, and a track parameter of each of the tracks is displayed.

In this embodiment, the target graphic file includes at least one of an audio file, a video file, an animation file, a moving-picture file, and a dynamic-expression file. The target graphic file is not limited to the above examples, with a main purpose to achieve a synchronous combination of sound, dynamic, and vibration feedback effects for files with dynamic effects.

The method for creating a tactile effect in real time through a gesture in the present disclosure is used to create a highly synchronized tactile effect on the target image file on a timeline, and a creation result can be experienced in real time.

In step S2, it is identified whether each of the tracks has the track parameter: if yes, the track parameter of the track is defined as an adjustable track parameter. If not, the track parameter of the track is considered to be unadjustable, that is, tactile creation cannot be entered.

Through the identification in step S2, track parameter adjustment may be performed on the tracks with the adjustable track parameters, that is, vibration parameters are written into the track parameters, which is reflected as feedback of the tactile effect.

In step S3, an inputted gesture tactile signal is detected in real time, a corresponding real-time vibration signal is generated based on the gesture tactile signal detected in real time according to a preset rule, a vibration unit is simultaneously driven through the real-time vibration signal to produce a corresponding vibration feedback effect, and the real-time vibration signal is synchronously written as an input parameter to the track parameter; wherein the real-time vibration signal is synchronized with the track on a timeline.

In this step, the gesture tactile signal is inputted through a virtual device, such as a touch screen of the electronic terminal. In this embodiment, the gesture tactile signal is generated by different touch modules displayed on the touch screen. The gesture tactile signal includes at least one of tap, long press, and swipe. Different tactile effects may alternatively be achieved by combining pressing strength, a pressing duration, and the like, so as to generate, in real time, a creative effect that combines vibration and sound effects.

In this embodiment, the preset rule includes:
defining the gesture tactile signal as tap when a duration of the gesture tactile signal is smaller than or equal to a preset duration, and generating, according to a tapping duration, a first real-time vibration signal whose generation duration is equal to the preset duration. For example, the preset duration is 100 ms. In other words, when the tapping duration of the gesture tactile signal is smaller than 100 ms, which is equal to 100 ms by default, the first real-time vibration signal with the corresponding duration of 100 ms is generated and inserted into the corresponding track parameter.

The gesture tactile signal is defined as long press when the duration of the gesture tactile signal is greater than the preset duration, and a second real-time vibration signal with a corresponding duration is generated according to a long-pressing duration.

Therefore, long-vibration and short-vibration tactile effects can be achieved.

Figure 2:
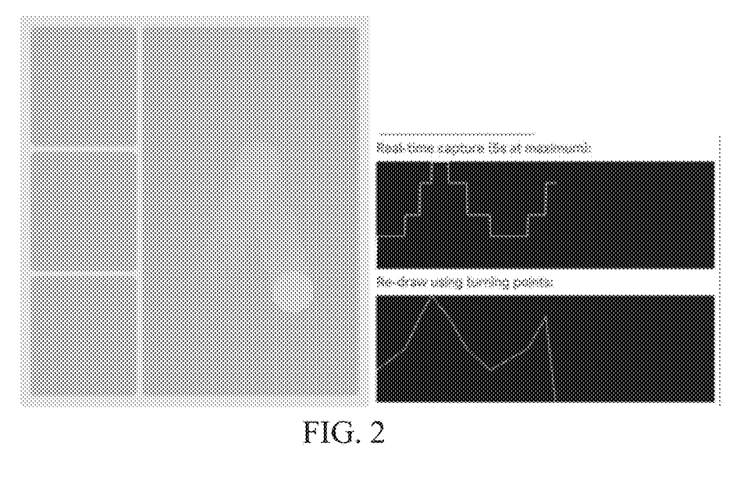
FIG. 2 is a schematic conversion diagram of converting gesture input into a vibration signal when a tactile effect is created through a swipe gesture in the method for creating a tactile effect in real time through a gesture according to an embodiment of the present disclosure.

In addition to the long-vibration and short-vibration tactile effects, in order to enrich the tactile effect, in the present disclosure, tactile effects of different vibration intensity are also added to meet requirements of generating different tactile feedback at different time points. Specifically, the preset rule further includes:
detecting the gesture tactile signal as swipe when it is detected that the gesture tactile signal is pressed continuously and enters different intensity intervals, generating a third real-time vibration signal with a corresponding duration according to a swiping duration, recording a vibration intensity value corresponding to a previous intensity interval each time the gesture tactile signal enters a different intensity interval, converting the vibration intensity value into a curve point of changes in vibration intensity, and writing the curve point into the third real-time vibration signal as an intensity change turning point of the third real-time vibration signal at a different time point. FIG. 2 is a schematic conversion diagram of converting gesture input into a vibration signal when a tactile effect is created through a swipe gesture in the method for creating a tactile effect in real time through a gesture according to an embodiment of the present disclosure.

The intensity intervals are N equal parts into which a touch screen region where the gesture tactile signal is inputted is divided from top to bottom, a difference corresponding to each of the equal parts is X, and an overall intensity interval range of the touch screen region where the gesture tactile signal is inputted is [0, X*N], where N and X are natural numbers.

In this embodiment, N=5, and X=20. An intensity interval of the touch screen region where the gesture tactile signal is inputted is [0, 100]. Specific data settings may be set as required based on a same principle.

In the case of great gesture swiping amplitude and a high speed, the number of curve points generated varies. In order to further optimize the vibration feedback effects of different intensity and make the tactile effect of vibration feedback more experiential, in the present disclosure, the preset rule further includes:
causing, when the third real-time vibration signal drives the vibration unit to produce a real-time vibration feedback effect and a number of the curve points exceeds an upper limit, the vibration unit to stop vibrating, removing the curve points exceeding the upper limit, and writing the curve points within an upper limit range into the third real-time vibration signal, to generate a final third real-time vibration signal.

In this embodiment, the upper limit of the curve points of the same third real-time vibration signal is 16.

In an embodiment, in order to better distinguish the vibration effects of long press and swipe and improve the tactile feedback experience, the preset rule further includes:
detecting, when the third real-time vibration signal drives the vibration unit to produce the real-time vibration feedback effect and the number of the curve points is within the upper limit range and the gesture tactile signal stagnates in a same intensity interval and swipes, a duration during which a current gesture tactile signal stagnates in the same intensity interval, and if a preset stagnation time is exceeded, causing the vibration unit to stop vibrating, and inserting the curve point into the third real-time vibration signal, to generate the final third real-time vibration signal.

In this embodiment, the preset stagnation duration is 5 s.

Further, in order to optimize the vibration feedback effect, the lower limit of the curve point is limited to prevent difficult distinction from the feedback effect of long press, if a number of the curve points of the final third real-time vibration signal is smaller than a lower limit at the end of vibration, the curve points equal to the lower limit are complemented at the end of the final third real-time vibration signal according to a basic criterion of the final third real-time vibration signal, that is, on the basis of generation of the final third real-time vibration signal, to update the final third real-time vibration signal.

For example, in this embodiment, the lower limit is 4. When the number of the curve points of the final third real-time vibration signal is smaller than the lower limit 4, for example, the curve point is 2, according to the final third real-time vibration signal with a curve point of 2, a minimum requirement of being equal to 4 curve points is met at the end of the 2 curve points thereof, so that the final third real-time vibration signal is updated and then written into the track parameter.

In step S4, all the real-time vibration signals generated within a playback duration of the target graphic file are bound to the target graphic file to form a final vibration signal of the target graphic file to cause the target graphic file to produce a tactile effect.

That is, the final first real-time vibration signal, the final second real-time vibration signal, and the final third real-time vibration signal (or an updated final third real-time vibration signal) are all bound to the target graphic file, to form a final vibration signal of the target graphic file.

Binding all the real-time vibration signals to the target graphic file means writing the vibration signal generated according to the preset rule, as a created track parameter, into an original track parameter, and merging the created track parameter with the original track parameter, thereby adding new effect output to an effect of the original track parameter. For example, a tactile effect in the form of vibration feedback is added to an original sound or animation effect.

With the above method, in the method for creating a tactile effect in real time through a gesture in the present disclosure, the user's gestures such as tap, long press, and swipe on the virtual device may be used as input parameters and converted into vibration effects, which ultimately correspond to outputted vibration tactile sensations. Therefore, paragraph-style tactile design can be performed on a touch interface. After gesture interaction, combination, and optimization in different virtual regions, the user's personalized tactile effect can be generated, which is easy and convenient to operate and achieves better user experience.

Figure 5:
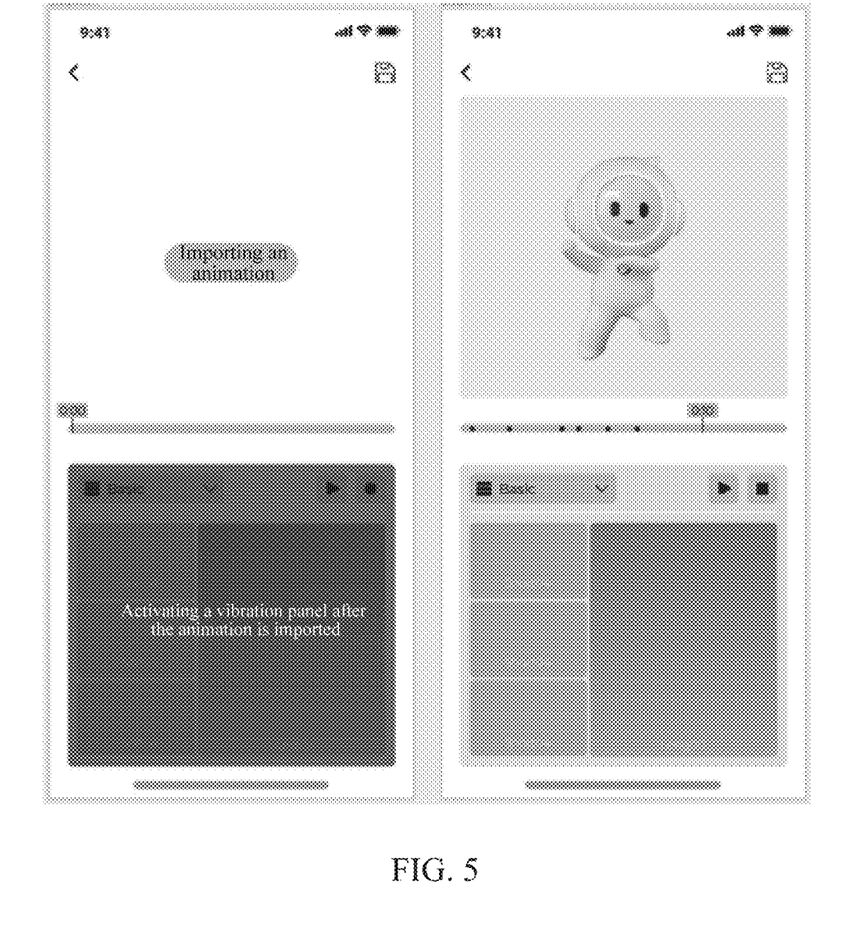
FIG. 5 is an example diagram of an application scene of the method for creating a tactile effect in real time through a gesture according to an embodiment of the present disclosure.

In the present disclosure, the method for creating a tactile effect in real time through a gesture may also be called a gesture tactile input method, which is a creative approach, and in addition to being used for vibration music scenes, may also match vibration tactile sensations for media such as videos, animations, moving pictures, and expressions, thereby bringing the user third-dimensional sensory experience in addition to vision and hearing on a virtual interface in the same manner. FIG. 5 is an example diagram of an application scene of the method for creating a tactile effect in real time through a gesture according to an embodiment of the present disclosure. After a touch panel is activated, the user may make customized vibration-related creations based on animation movements or sound rhythms.

Compared with the related art, according to the method for creating a tactile effect in real time through a gesture and the related device in the present disclosure, a target graphic file is split into tracks, a track parameter of each of the tracks is displayed, an inputted gesture tactile signal is detected in real time, a corresponding real-time vibration signal is generated based on the gesture tactile signal according to a preset rule, and the real-time vibration signal is synchronously written as an input parameter to the track parameter, so as to convert the gesture tactile signal into a real-time vibration signal for output. A gesture has strong interactive correlation with intensity and a frequency thereof, and a converted vibration effect parameter changes in real time with the gesture, thereby achieving a purpose of creating a tactile effect through the gesture, so that the user can customize tactile effects for target audio and video files, which is easy and convenient to operate and brings better user experience.

Embodiment 2

Figure 3:
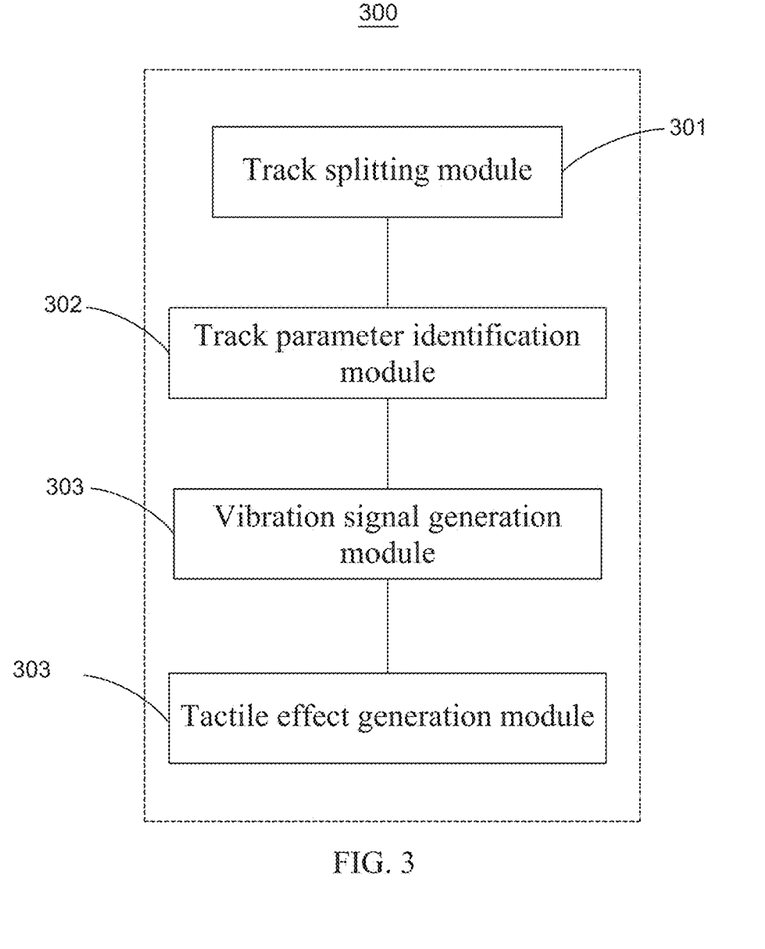
FIG. 3 is a structural block diagram of a system for creating a tactile effect in real time through a gesture according to an embodiment of the present disclosure.

FIG. 3 is a structural block diagram of a system for creating a tactile effect in real time through a gesture according to an embodiment of the present disclosure. An embodiment of the present disclosure further provides a system 300 for creating a tactile effect in real time through a gesture, including the following modules.

A track splitting module 301 is configured to acquire a target graphic file, automatically split the target graphic file into tracks, and display a track parameter of each of the tracks.

In this embodiment, the target graphic file includes at least one of an audio file, a video file, an animation file, a moving-picture file, and a dynamic-expression file. The target graphic file is not limited to the above examples, with a main purpose to achieve a synchronous combination of sound, dynamic, and vibration feedback effects for files with dynamic effects.

A track parameter identification module 302 is configured to identify whether each of the tracks has the track parameter: if yes, define the track parameter of the track as an adjustable track parameter. If not, the track parameter of the track is considered to be unadjustable, that is, tactile creation cannot be entered.

Track parameter adjustment may be performed on the tracks with the adjustable track parameters, that is, vibration parameters are written into the track parameters, which is reflected as feedback of the tactile effect.

A vibration signal generation module 303 is configured to detect an inputted gesture tactile signal in real time, generate, based on the gesture tactile signal detected in real time, a corresponding real-time vibration signal according to a preset rule, simultaneously drive, through the real-time vibration signal, a vibration unit to produce a corresponding vibration feedback effect, and synchronously write the real-time vibration signal as an input parameter to the track parameter; wherein the real-time vibration signal is synchronized with the track on a timeline, to ensure that the tactile effect of vibration feedback is synchronized with content of the target image file.

In this embodiment, the gesture tactile signal is inputted through a virtual device, such as a touch screen of the electronic terminal. In this embodiment, the gesture tactile signal is generated by different touch modules displayed on the touch screen. The gesture tactile signal includes at least one of tap, long press, and swipe. Different tactile effects may alternatively be achieved by combining pressing strength, a pressing duration, and the like, so as to generate, in real time, a creative effect that combines vibration and sound effects.

In this embodiment, the preset rule includes:
defining the gesture tactile signal as tap when a duration of the gesture tactile signal is smaller than or equal to a preset duration, and generating, according to a tapping duration, a first real-time vibration signal whose generation duration is equal to the preset duration. For example, the preset duration is 100 ms. In other words, when the tapping duration of the gesture tactile signal is smaller than 100 ms, which is equal to 100 ms by default, the first real-time vibration signal with the corresponding duration of 100 ms is generated and inserted into the corresponding track parameter.

The gesture tactile signal is defined as long press when the duration of the gesture tactile signal is greater than the preset duration, and a second real-time vibration signal with a corresponding duration is generated according to a long-pressing duration.

Therefore, long-vibration and short-vibration tactile effects can be achieved.

In addition to the long-vibration and short-vibration tactile effects, in order to enrich the tactile effect, in the present disclosure, tactile effects of different vibration intensity are also added to meet requirements of generating different tactile feedback at different time points. Specifically, the preset rule further includes:

detecting the gesture tactile signal as swipe when it is detected that the gesture tactile signal is pressed continuously and enters different intensity intervals, generating a third real-time vibration signal with a corresponding duration according to a swiping duration, recording a vibration intensity value corresponding to a previous intensity interval each time the gesture tactile signal enters a different intensity interval, converting the vibration intensity value into a curve point of changes in vibration intensity, and writing the curve point into the third real-time vibration signal as an intensity change turning point of the third real-time vibration signal at a different time point. FIG. 2 is a schematic conversion diagram of converting gesture input into a vibration signal when a tactile effect is created through a swipe gesture in the method for creating a tactile effect in real time through a gesture according to an embodiment of the present disclosure.

The intensity intervals are N equal parts into which a touch screen region where the gesture tactile signal is inputted is divided from top to bottom, a difference corresponding to each of the equal parts is X, and an overall intensity interval range of the touch screen region where the gesture tactile signal is inputted is [0, X*N], where N and X are natural numbers.

In this embodiment, N=5, and X=20. An intensity interval of the touch screen region where the gesture tactile signal is inputted is [0, 100]. Specific data settings may be set as required based on a same principle.

In the case of great gesture swiping amplitude and a high speed, the number of curve points generated varies. In order to further optimize the vibration feedback effects of different intensity and make the tactile effect of vibration feedback more experiential, in the present disclosure, the preset rule further includes:

causing, when the third real-time vibration signal drives the vibration unit to produce a real-time vibration feedback effect and a number of the curve points exceeds an upper limit, the vibration unit to stop vibrating, removing the curve points exceeding the upper limit, and writing the curve points within an upper limit range into the third real-time vibration signal, to generate a final third real-time vibration signal.

In this embodiment, the upper limit of the curve points of the same third real-time vibration signal is 16.

In an embodiment, in order to better distinguish the vibration effects of long press and swipe and improve the tactile feedback experience, the preset rule further includes: detecting, when the third real-time vibration signal drives the vibration unit to produce the real-time vibration feedback effect and the number of the curve points is within the upper limit range and the gesture tactile signal stagnates in a same intensity interval and swipes, a duration during which a current gesture tactile signal stagnates in the same intensity interval, and if a preset stagnation time is exceeded, causing the vibration unit to stop vibrating, and inserting the curve point into the third real-time vibration signal, to generate the final third real-time vibration signal.

In this embodiment, the preset stagnation duration is 5 s.

Further, in order to optimize the vibration feedback effect, the lower limit of the curve point is limited to prevent difficult distinction from the feedback effect of long press, if a number of the curve points of the final third real-time vibration signal is smaller than a lower limit at the end of vibration, the curve points equal to the lower limit are complemented at the end of the final third real-time vibration signal according to a basic criterion of the final third real-time vibration signal, that is, on the basis of generation of the final third real-time vibration signal, to update the final third real-time vibration signal.

For example, in this embodiment, the lower limit is 4. When the number of the curve points of the final third real-time vibration signal is smaller than the lower limit 4, for example, the curve point is 2, according to the final third real-time vibration signal with a curve point of 2, a minimum requirement of being equal to 4 curve points is met at the end of the 2 curve points thereof, so that the final third real-time vibration signal is updated and then written into the track parameter.

A tactile effect generation module 304 is configured to bind all the real-time vibration signals generated within a playback duration of the target graphic file to the target graphic file to form a final vibration signal of the target graphic file to cause the target graphic file to produce a tactile effect.

In this embodiment, the technical effect and the principle achieved by the system for creating a tactile effect in real time through a gesture are the same as those achieved by the method for creating a tactile effect in real time through a gesture provided above in the present disclosure. Details are not described herein again.

Embodiment 3

Figure 4:
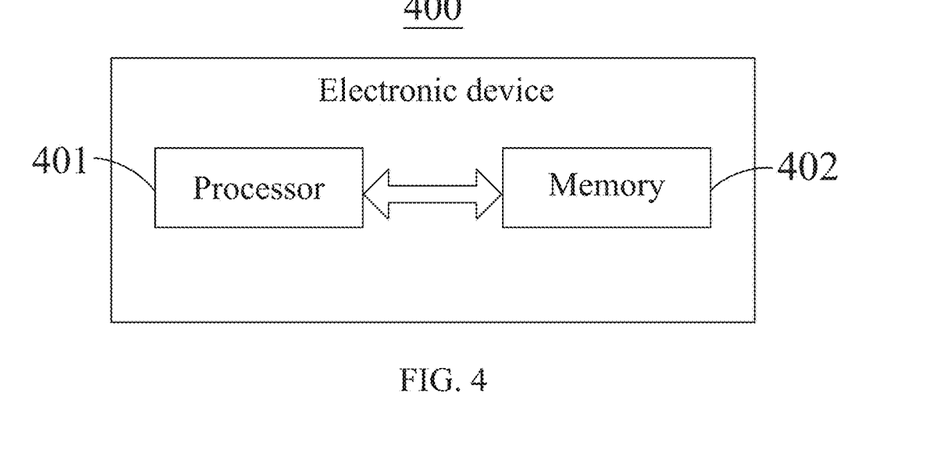
FIG. 4 is a structural block diagram of an electronic device according to an embodiment of the present disclosure.

Referring to FIG. 4, an embodiment of the present disclosure further provides an electronic device 400, including a processor 401, a memory 402, and a program for creating a tactile effect in real time through a gesture that is stored in the memory 402 and executable by the processor 401. When the program for creating a tactile effect in real time through a gesture is executed by the processor 401, the following steps in the method for creating a tactile effect in real time through a gesture as provided above in the present disclosure are implemented.

In step S1, a target graphic file is acquired, the target graphic file is automatically split into tracks, and a track parameter of each of the tracks is displayed.

In step S2, it is identified whether each of the tracks has the track parameter: if yes, the track parameter of the track is defined as an adjustable track parameter.

In step S3, an inputted gesture tactile signal is detected in real time, a corresponding real-time vibration signal is generated based on the gesture tactile signal detected in real time according to a preset rule, a vibration unit is simultaneously driven through the real-time vibration signal to produce a corresponding vibration feedback effect, and the real-time vibration signal is synchronously written as an input parameter to the track parameter; wherein the real-time vibration signal is synchronized with the track on a timeline. The preset rule is the same as that in the method for creating a tactile effect in real time through a gesture as provided above. Details are not described herein again.

In step S4, all the real-time vibration signals generated within a playback duration of the target graphic file are bound to the target graphic file to form a final vibration signal of the target graphic file to cause the target graphic file to produce a tactile effect.

The memory 402 may be used to store software programs and various data. The memory 402 may mainly include a program storage region and a data storage region. The program storage region may store an operating system, an application required by at least one function (such as a sound playback function and an image playback function), and the like. The data storage region may store data (such as audio data and a phone book) created according to use of a mobile phone. In addition, the memory 402 may include a high-speed random access memory, and may also include a non-volatile memory, such as at least one magnetic disk storage device, a flash memory device, or other volatile solid-state storage devices.

The processor 401 is a control center of a terminal, which uses various interfaces and lines to connect various parts of the entire terminal, and executes various functions of the terminal and processes data by running or executing software programs and/or modules stored in the memory 402 and calling data stored in the memory 402, so as to monitor the terminal as a whole. The processor 401 may include one or more processing units. In an embodiment, the processor 401 may integrate an application processor and a modem processor. The application processor mainly processes an operating system, a user interface, applications, and the like. The modem processor mainly deals with wireless communication. It may be understood that the above modem processor may not be integrated into the processor 401.

It is to be noted that, in use, the electronic device 400 can achieve the technical effect achieved by the method for creating a tactile effect in real time through a gesture as described above. Refer to the description in the method for creating a tactile effect in real time through a gesture above for details, which are not described herein again.

Embodiment 4

An embodiment of the present disclosure further provides a computer-readable storage medium. The computer-readable storage medium stores a program for creating a tactile effect in real time through a gesture, and when the program for creating a tactile effect in real time through a gesture is executed by a processor, steps in the method for creating a tactile effect in real time through a gesture as provided above in the present disclosure are implemented, so the technical effect achieved is the same as that achieved by the method for creating a tactile effect in real time through a gesture above. Details are not described herein again.

The computer-readable storage medium is, for example, a read-only memory (ROM), a random access memory (RAM), a magnetic disk, an optical disc, or the like.

It is to be noted that, herein, the terms such as "comprise", "include", and any variants thereof are intended to cover a non-exclusive inclusion, so that a process, method, item, or apparatus including a series of elements includes not only those elements but also other elements not expressly listed or elements inherent to the process, method, item, or apparatus. Without further limitations, an element defined by the statement "comprising/including a/an . . . " does not exclude the presence of additional identical elements in the process, method, item, or apparatus that includes the element.

Through the above description of the embodiments, those skilled in the art can clearly understand that the methods in the above embodiments can be implemented by software plus a necessary general hardware platform, which may certainly be implemented by hardware, but in many cases the former is better. Based on such understanding, the technical solution of the present disclosure essentially or the part that contributes to the prior art can be embodied in the form of a software product. The computer software product is stored in a storage medium (such as a ROM/RAM, a magnetic disk, or an optical disc), and includes several instructions to cause a terminal (which may be a mobile phone, a computer, a server, an air conditioner, a network device, or the like) to perform the methods described in the various embodiments of the present disclosure.

The above are merely the embodiments of the present disclosure. It should be noted herein that, for those skilled in the art, improvements can be made without departing from the creative concept of the present disclosure, but these all fall within the protection scope of the present disclosure.

What is claimed is:

1. A method for creating a tactile effect in real time through a gesture, the method being applied to a touch-screen electronic terminal and comprising the following steps:
   acquiring a target graphic file, automatically splitting the target graphic file into tracks, and displaying a track parameter of each of the tracks;
   identifying whether each of the tracks has the track parameter, if yes, defining the track parameter of the track as an adjustable track parameter;
   detecting an inputted gesture tactile signal in real time, generating, based on the gesture tactile signal detected in real time, a corresponding real-time vibration signal according to a preset rule, simultaneously driving, through the real-time vibration signal, a vibration unit to produce a corresponding vibration feedback effect, and synchronously writing the real-time vibration signal as an input parameter to the track parameter; wherein the real-time vibration signal is synchronized with the track on a timeline; and
   binding all the real-time vibration signals generated within a playback duration of the target graphic file to the target graphic file to form a final vibration signal of the target graphic file to cause the target graphic file to produce a tactile effect.

2. The method for creating a tactile effect in real time through a gesture as described in claim 1, wherein the target graphic file comprises at least one of an audio file, a video file, an animation file, a moving-picture file, and a dynamic-expression file.

3. The method for creating a tactile effect in real time through a gesture as described in claim 1, wherein the gesture tactile signal comprises at least one of tap, long press, and swipe.

4. The method for creating a tactile effect in real time through a gesture as described in claim 3, wherein the gesture tactile signal is generated by different touch modules displayed on a touch screen.

5. The method for creating a tactile effect in real time through a gesture as described in claim 3, wherein the preset rule comprises:
   defining the gesture tactile signal as tap when a duration of the gesture tactile signal is smaller than or equal to a preset duration, and generating, according to a tapping duration, a first real-time vibration signal whose generation duration is equal to the preset duration; and defining the gesture tactile signal as long press when the duration of the gesture tactile signal is greater than the preset duration, and generating, according to a long-pressing duration, a second real-time vibration signal with a corresponding duration.

6. The method for creating a tactile effect in real time through a gesture as described in claim 5, wherein the preset duration is 100 ms.

7. The method for creating a tactile effect in real time through a gesture as described in claim 3, wherein the preset rule further comprises:

detecting the gesture tactile signal as swipe when it is detected that the gesture tactile signal is pressed continuously and enters different intensity intervals, generating a third real-time vibration signal with a corresponding duration according to a swiping duration, recording a vibration intensity value corresponding to a previous intensity interval each time the gesture tactile signal enters a different intensity interval, converting the vibration intensity value into a curve point of changes in vibration intensity, and writing the curve point into the third real-time vibration signal as an intensity change turning point of the third real-time vibration signal at a different time point; wherein the intensity intervals are N equal parts into which a touch screen region where the gesture tactile signal is inputted is divided from top to bottom, a difference corresponding to each of the equal parts is X, and an overall intensity interval range of the touch screen region where the gesture tactile signal is inputted is [0, X*N], where N and X are natural numbers.

8. The method for creating a tactile effect in real time through a gesture as described in claim 7, wherein the preset rule further comprises:

causing, when the third real-time vibration signal drives the vibration unit to produce a real-time vibration feedback effect and a number of the curve points exceeds an upper limit, the vibration unit to stop vibrating, removing the curve points exceeding the upper limit, and writing the curve points within an upper limit range into the third real-time vibration signal, to generate a final third real-time vibration signal.

9. The method for creating a tactile effect in real time through a gesture as described in claim 8, wherein the preset rule further comprises:

detecting, when the third real-time vibration signal drives the vibration unit to produce the real-time vibration feedback effect and the number of the curve points is within the upper limit range and the gesture tactile signal stagnates in a same intensity interval and swipes, a duration during which a current gesture tactile signal stagnates in the same intensity interval, and if a preset stagnation time is exceeded, causing the vibration unit to stop vibrating, and inserting the curve point into the third real-time vibration signal, to generate the final third real-time vibration signal; and complementing, if a number of the curve points of the final third real-time vibration signal is smaller than a lower limit at the end of vibration, the curve points equal to the lower limit at the end of the final third real-time vibration signal according to a basic criterion of the final third real-time vibration signal, to update the final third real-time vibration signal.

10. The method for creating a tactile effect in real time through a gesture as described in claim 9, wherein N=5, and X=20; and an intensity interval of the touch screen region where the gesture tactile signal is inputted is [0, 100];

for the curve points of the same third real-time vibration signal, the upper limit is 16, and the lower limit is 4; and the preset duration is 5 s.

11. A system for creating a tactile effect in real time through a gesture, the system comprising:

a track splitting module configured to acquire a target graphic file, automatically split the target graphic file into tracks, and display a track parameter of each of the tracks;

a track parameter identification module configured to identify whether each of the tracks has the track parameter: if yes, define the track parameter of the track as an adjustable track parameter;

a vibration signal generation module configured to detect an inputted gesture tactile signal in real time, generate, based on the gesture tactile signal detected in real time, a corresponding real-time vibration signal according to a preset rule, simultaneously drive, through the real-time vibration signal, a vibration unit to produce a corresponding vibration feedback effect, and synchronously write the real-time vibration signal as an input parameter to the track parameter; wherein the real-time vibration signal is synchronized with the track on a timeline; and a tactile effect generation module configured to bind all the real-time vibration signals generated within a playback duration of the target graphic file to the target graphic file to form a final vibration signal of the target graphic file to cause the target graphic file to produce a tactile effect.

12. An electronic device, comprising a processor, a memory, and a program for creating a tactile effect in real time through a gesture that is stored in the memory and executable by the processor, wherein, when the program for creating a tactile effect in real time through a gesture is executed by the processor, steps in the method for creating a tactile effect in real time through a gesture as described in claim 1 are implemented.

* * * * *